US 8,673,227 B2

(12) United States Patent
Black et al.

(10) Patent No.: US 8,673,227 B2
(45) Date of Patent: Mar. 18, 2014

(54) SYSTEM FOR REMOVAL OF CARBON DIOXIDE FROM A PROCESS GAS

(71) Applicant: ALSTOM Technology Ltd, Baden (CH)

(72) Inventors: Sean E. Black, Knoxville, TN (US);
Sanjay K. Dube, Knoxville, TN (US);
David J. Muraskin, Knoxville, TN (US); Frederic Z. Kozak, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/647,046

(22) Filed: Oct. 8, 2012

(65) Prior Publication Data

US 2013/0028807 A1    Jan. 31, 2013

Related U.S. Application Data

(60) Division of application No. 12/639,597, filed on Dec. 16, 2009, now Pat. No. 8,309,047, which is a continuation-in-part of application No. 12/622,653, filed on Nov. 20, 2009, and a continuation-in-part of application No. 12/560,004, filed on Sep. 15, 2009.

(51) Int. Cl.
*B01D 53/18* (2006.01)
*B01D 53/62* (2006.01)

(52) U.S. Cl.
USPC ............ 422/168; 96/242; 422/169; 422/171; 422/235

(58) Field of Classification Search
USPC ............ 422/168, 169, 170, 171, 235; 96/242
See application file for complete search history.

(56) References Cited

U.S. PATENT DOCUMENTS

| 2,106,734 A | 2/1935 | Gollmar |
| 2,043,109 A | 6/1936 | McKee et al. |

(Continued)

FOREIGN PATENT DOCUMENTS

| AU | 648129 | 7/1992 |
| AU | 678622 | 6/1995 |

(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Jill Warden
*Assistant Examiner* — Joye L Woodard
(74) *Attorney, Agent, or Firm* — Robert D. Crawford (57) ABSTRACT

A system for removal of carbon dioxide from a process gas includes an absorption arrangement arranged to allow contact between the process gas and an ammoniated solution within the absorption arrangement such that at least a part of the carbon dioxide of the process gas is captured by the ammoniated solution. The absorption arrangement is arranged to, with regard to the ammoniated solution, only accommodate ammoniated solution without solids. A first heat exchanger is arranged to cool the ammoniated solution including captured carbon dioxide after it has exited the absorption arrangement. A separator is arranged to remove at least a part of any solids in the cooled ammoniated solution. A second heat exchanger is arranged to heat the ammoniated solution after it has exited the separator and returned to the absorption arrangement.

15 Claims, 1 Drawing Sheet

(56) References Cited

U.S. PATENT DOCUMENTS

| | | | |
|---|---|---|---|
| 2,487,576 A | 11/1949 | Meyers | |
| 2,608,461 A | 8/1952 | Frazier | |
| 2,878,099 A | 3/1959 | Breuing et al. | |
| 3,255,233 A | 6/1966 | Kunze et al. | |
| 3,923,955 A | 12/1975 | Fattinger | |
| 3,947,258 A | 3/1976 | Decker | |
| 4,515,760 A | 5/1985 | Lang et al. | |
| 4,847,057 A | 7/1989 | Brugerolle et al. | |
| 4,853,012 A | 8/1989 | Batteux et al. | |
| 4,977,745 A | 12/1990 | Heichberger | |
| 4,999,031 A | 3/1991 | Gerhardt et al. | |
| 5,067,972 A | 11/1991 | Hemmings et al. | |
| 5,137,550 A | 8/1992 | Hegarty et al. | |
| 5,186,916 A | 2/1993 | Nevels | |
| 5,318,758 A | 6/1994 | Fujii | |
| 5,378,442 A | 1/1995 | Fujii et al. | |
| 5,427,759 A | 6/1995 | Heitmann | |
| 5,453,115 A | 9/1995 | Vuletić | |
| 5,462,583 A | 10/1995 | Wood et al. | |
| 5,599,508 A | 2/1997 | Martinelli et al. | |
| 5,648,053 A | 7/1997 | Mimura et al. | |
| 5,700,311 A | 12/1997 | Spencer | |
| 5,756,058 A | 5/1998 | Watanabe et al. | |
| 5,832,712 A | 11/1998 | Rønning et al. | |
| 5,853,680 A | 12/1998 | Iijima et al. | |
| 5,935,547 A * | 8/1999 | LeComte et al. | 423/242.2 |
| 5,979,180 A | 11/1999 | Lebas et al. | |
| 6,027,552 A | 2/2000 | Ruck et al. | |
| 6,210,467 B1 | 4/2001 | Howard | |
| 6,348,088 B2 | 2/2002 | Chung | |
| 6,372,023 B1 | 4/2002 | Kiyono et al. | |
| 6,458,188 B1 | 10/2002 | Mace | |
| 6,485,547 B1 | 11/2002 | Iijima | |
| 6,497,852 B2 | 12/2002 | Chakravarti et al. | |
| 6,506,350 B2 | 1/2003 | Cooper et al. | |
| 6,759,022 B2 | 7/2004 | Hammer et al. | |
| 6,764,530 B2 | 7/2004 | Iijima | |
| 7,022,296 B1 | 4/2006 | Khang et al. | |
| 7,083,662 B2 | 8/2006 | Xu et al. | |
| 7,128,777 B2 | 10/2006 | Spencer | |
| 7,160,456 B2 | 1/2007 | Järventie | |
| 7,255,842 B1 | 8/2007 | Yeh et al. | |
| 7,976,621 B2 * | 7/2011 | Shoemaker et al. | 96/242 |
| 2003/0045756 A1 | 3/2003 | Mimura et al. | |
| 2003/0140786 A1 | 7/2003 | Iijima | |
| 2004/0123736 A1 | 7/2004 | Torres, Jr. et al. | |
| 2004/0126294 A1 | 7/2004 | Cooper et al. | |
| 2005/0169825 A1 | 8/2005 | Cadours et al. | |
| 2006/0178259 A1 | 8/2006 | Schubert et al. | |
| 2006/0204425 A1 | 9/2006 | Kamijo et al. | |
| 2007/0006565 A1 | 1/2007 | Fleischer et al. | |
| 2008/0072762 A1 | 3/2008 | Gal | |
| 2008/0159937 A1 | 7/2008 | Ouimet | |
| 2008/0178733 A1 | 7/2008 | Gal | |
| 2008/0307968 A1 | 12/2008 | Kang et al. | |
| 2009/0036727 A1 | 2/2009 | Kurukchi et al. | |
| 2009/0101012 A1 | 4/2009 | Gal et al. | |
| 2009/0104098 A1 | 4/2009 | Singh | |
| 2009/0155889 A1 | 6/2009 | Handagama et al. | |
| 2009/0191114 A1 | 7/2009 | Liu et al. | |
| 2009/0282977 A1 | 11/2009 | Koss | |
| 2011/0061533 A1 | 3/2011 | Black et al. | |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| CN | 1176297 | 3/1998 |
| CN | 1772345 | 5/2006 |
| CN | 1833756 | 9/2006 |
| CN | 101318651 | 12/2008 |
| CN | 101500691 | 8/2009 |
| DE | 469840 | 12/1928 |
| DE | 2832493 | 7/1978 |
| DE | 3633690 | 4/1988 |
| DE | 19909923 | 3/2000 |
| DE | 19929408 | 1/2001 |
| DE | 10 2005 03383 | 1/2007 |
| EP | 0243778 | 11/1987 |
| EP | 0502596 | 9/1992 |
| EP | 0553643 | 8/1993 |
| EP | 0588178 | 3/1994 |
| EP | 1759756 | 3/2007 |
| FR | 2108958 | 5/1972 |
| GB | 271852 | 5/1926 |
| GB | 871207 | 6/1961 |
| GB | 899611 | 6/1962 |
| GB | 2331526 | 5/1999 |
| JP | 49-28574 | 3/1974 |
| JP | 54-19477 | 2/1979 |
| JP | 55-79026 | 6/1980 |
| JP | 57-68118 | 4/1982 |
| JP | 10 202054 | 8/1998 |
| JP | 11 137960 | 5/1999 |
| KR | 100703999 B1 | 3/2007 |
| SU | 512785 | 5/1976 |
| SU | 1567251 | 5/1990 |
| WO | 98/47604 | 10/1998 |
| WO | 02/09849 | 2/2002 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/072979 | 6/2008 |
| WO | 2008/094777 | 8/2008 |
| WO | 2008/101293 | 8/2008 |
| WO | 2009/009725 | 1/2009 |
| WO | 2010/053683 | 5/2010 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Environmental Tech. And Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliminary Results" International Journal of Thermodynamics, International Centre for Applied Thermodynamics, Istanbul, TR, vol. 7, No. 4, Dec. 1, 2004, pp. 173-181.

"Semi-batch absorption and regeneration studies for CO2 capture by aqueous ammonia", Fuel Processing Technology, vol. 86, No. 14-15, Oct. 1, 2005, pp. 1533-1546.

W09/020-0—PCT International Search Report and The Written Opinion of the International Searching Authority, dated Nov. 19, 2010 (PCT/US2010/047425).

W09/020-1—PCT International Search Report and The Written Opinion of the International Searching Authority, dated Nov. 19, 2010 (PCT/US2010/047426).

W09/023-0—PCT International Search Report and the Written Opinion of the international Searching Authority, dated Nov. 19, 2010 (PCT/US2010/047421).

(56) References Cited

OTHER PUBLICATIONS

First Office Action from the Chinese Patent Office issued Oct. 29, 2013 for CN application 201080051669.3.

First Office Action from the Chinese Patent Office issued Nov. 20, 2013 for CN application 201080051666.X.

First Office Action from the Chinese Patent Office issued Nov. 29, 2013 for CN application 201080051660.2.

* cited by examiner

SYSTEM FOR REMOVAL OF CARBON DIOXIDE FROM A PROCESS GAS

CROSS REFERENCE TO RELATED APPLICATIONS

This is a divisional application of pending application Ser. No. 12/639,597 filed Dec. 16, 2009, which is a Continuation-In-Part of U.S. patent application Ser. No. 12/622,653, filed Nov. 20, 2009, and a Continuation-In-Part of U.S. patent application Ser. No. 12/560,004, filed Sep. 15, 2009, each incorporated herein in its entirety by reference.

TECHNICAL FIELD

The present invention relates to a method for removal of carbon dioxide from a process gas by contacting the process gas with an ammoniated solution.

BACKGROUND

Most of the energy used in the world today is derived from the combustion of carbon and hydrogen containing fuels such as coal, oil and natural gas, as well as other organic fuels. Such combustion generates flue gases containing high levels of carbon dioxide. Due to concerns about global warming, there is an increasing demand for the reduction of emissions of carbon dioxide to the atmosphere, why methods have been developed to remove the carbon dioxide from flue gases before the gas is released to the atmosphere.

WO 2006/022885 (U.S. patent application Ser. No. 11/632,537, filed Jan. 16, 2007, and which is incorporated by reference herein in its entirety) discloses one such method of removing carbon dioxide from a flue gas, which method includes capturing carbon dioxide from the flue gas in a $CO_2$ absorber by means of an ammoniated solution or slurry. The $CO_2$ is absorbed by the ammoniated solution in the absorber at a reduced temperature of between 0° C. and 20° C., after which the ammoniated solution is regenerated in a regenerator under elevated pressure and temperature to allow the $CO_2$ to escape the ammoniated solution as gaseous carbon dioxide of high purity.

SUMMARY

An objective of the present invention is to improve the method of carbon dioxide absorption with an ammoniated solution.

This objective, as well as other objectives that will be clear from the following discussion, is according to one aspect achieved by a method of removing carbon dioxide from a process gas, the method comprising: contacting an ammoniated solution with the process gas in an absorption arrangement, the ammoniated solution capturing at least a part of the carbon dioxide of the process gas, wherein the molar ratio, R, of ammonia to carbon dioxide in the ammoniated solution is controlled such that substantially no precipitation of solids occurs within the absorption arrangement; allowing ammoniated solution including captured carbon dioxide to exit the absorption arrangement; cooling the ammoniated solution that has exited the absorption arrangement, wherein at least a part of the captured carbon dioxide is precipitated as solid salt; separating at least a part of the precipitated salt from the ammoniated solution; heating the ammoniated solution from which the at least a part of the precipitated salt has been separated, such that substantially no solids are present in the heated ammoniated solution; and allowing the heated ammoniated solution to re-enter the absorption arrangement.

The absorption arrangement may comprise one or several absorbers, such as absorption stages. A plurality of absorbers of the absorption arrangement may be arranged together in a common frame or casing, or arranged separate from each other only connected via piping, conduits etc. In its simplest design, the absorption arrangement may comprise only one absorber. This simple design will also simplify the carbon dioxide removal method and will reduce the maintenance costs for the arrangement. The absorber or absorbers may be of any design that allows direct contact between the ammoniated solution and the process gas to take place within the absorber.

By contacting the ammoniated solution with the process gas, carbon dioxide may be removed from the process gas and captured by the ammoniated solution by crossing the formed interface between the process gas and the ammoniated solution.

There is a limit to how much carbon dioxide the ammoniated solution may capture, i.e. when the ammoniated solution reaches saturation. This limit depends on e.g. the pressure and temperature of the solution. By cooling the ammoniated solution, the ability of the solution to dissolve the carbon dioxide is reduced, whereby at least a part of the captured carbon dioxide is precipitated as solid salt. Even if the ammoniated solution has not reached saturation in the absorption arrangement and no solids have been precipitated prior to the cooling of the solution, the cooling of the ammoniated solution may allow for precipitation of captured carbon dioxide in the form of a solid salt. Thus, at least part of the captured carbon dioxide may be separated from the ammoniated solution, e.g. by a separator, by removing at least a part of the precipitated solids.

The ammoniated solution after separation may be saturated with carbon dioxide since only the carbon dioxide in solid precipitated form is removed, not carbon dioxide dissolved in the solution. By heating the ammoniated solution, the ability of the solution to dissolve carbon dioxide is increased even though the molar ratio R is unchanged, allowing the ammoniated solution to return to the absorption arrangement to capture more carbon dioxide without precipitation of solids.

By cooling the ammoniated solution, removing the solids, and re-heating the solution, most of the ammoniated solution may be returned to the absorption arrangement to capture more carbon dioxide without precipitation of solids. Thus, there is no need to regenerate the entire solution stream. Instead, the much smaller volume of solids, and optionally some solution, removed by separation and having a much higher carbon dioxide concentration may be transferred to a regenerator. Since the regenerator applies increased pressure and temperature to the solid material, solution, suspension or slurry being regenerated in order to obtain leaving carbon dioxide of high purity, the energy consumption is much reduced if the volume of the solution, suspension or slurry is reduced and the carbon dioxide concentration is increased.

Also, by inducing precipitation of solids by cooling the ammoniated solution, carbon dioxide in the form of solid salt may be removed from the ammoniated solution even though the ammoniated solution exiting the absorption arrangement contains no precipitated solids, i.e. the ammoniated solution exiting the absorption arrangement might be rich in carbon dioxide but not completely saturated or supersaturated and still allow for removal of carbon dioxide in solid form by e.g. a separator. This implies that the precipitation of solids within the absorption arrangement and the absorber may be avoided compared with if no cooling was performed.

Precipitation of solids in the absorption arrangement may be undesirable since the solids may clog pipes, valves, pumps, absorbers etc., and may also increase the wear of the absorption arrangement due to increased abrasion by the ammoniated solution flow. If there is no precipitation in the absorption arrangement, the absorption arrangement may not have to be designed to accommodate for solid particles in the ammoniated solution whereby the absorption arrangement may be designed in a simpler and cheaper way and for more efficient carbon dioxide capture, e.g. by a more effective packing material in the absorber if a packing material is used, which packing material might otherwise be clogged and result in excessive pressure drop. Also, the maintenance of the absorption arrangement may be greatly reduced.

The amount of captured carbon dioxide in relation to the amount of ammonia in the ammoniated solution is illustrated with the molar ratio R between the ammonia ($NH_3$) and the carbon dioxide ($CO_2$) present in the ammoniated solution, i.e. $R=[NH_3]/[CO_2]$. According to the present method, R is kept at a level such that substantially no precipitation occurs within the absorption arrangement.

Controlling the R of the ammoniated solution such that no precipitation of solid salt occurs within the absorption arrangement may be achieved in many different ways, such as by controlling the flow rate of the ammoniated solution exiting the absorption arrangement and thus also controlling the flow rate of ammoniated solution re-entering the absorption arrangement, by controlling the temperature to which the ammoniated solution is cooled down in order to induce precipitation as well as controlling the temperature to which the ammoniated solution is heated before re-entering the absorption arrangement, by controlling a flow of ammoniated solution having an R value above the precipitation threshold into the absorption arrangement other than the flow of re-entering separated ammoniated solution and/or by controlling the temperature(s) of the absorption arrangement and its different parts.

The molar ratio, R, of ammonia to carbon dioxide in the absorption arrangement is kept at a level such that substantially no precipitation occurs within the absorption arrangement at the temperature and pressure of the ammoniated solution in the absorption arrangement. This implies that the molar ratio R of the ammoniated solution that exits the absorption arrangement is also high enough to avoid precipitation. Thus, R of the solution that exits the absorption arrangement may be at least 1.8, more preferably at least 1.9, such as about 1.95, to avoid precipitation at the operating temperature of the absorption arrangement.

The temperature of the ammoniated solution that exits the absorption arrangement may be between 10° C. and 25° C., such as between 15° C. and 20° C., at which temperature range the ammoniated solution is saturated at an R of about 1.95. It may be undesirable to have a lower temperature since then less carbon dioxide may be captured before the solution reaches saturation and solid salt is precipitated. In other words, the R of saturation will be higher. It may also be undesirable to have a higher temperature since too much ammonia may then evaporate from the ammoniated solution, lowering the R of the solution and reducing the amount of carbon dioxide that may be captured by the ammoniated solution before saturation and precipitation, as well as contaminating the process gas.

It may be advantageous to operate the absorption arrangement with an R of the exiting ammoniated solution that is close to saturation, such as an R of less than 4.0, conveniently less than 2.5, more preferably less than 2.0, such as 1.95. This implies that the ammoniated solution may be used to, or close to, its full potential, capturing as much carbon dioxide as possible without any precipitation, making the carbon dioxide removal method more efficient.

After heating the ammoniated solution, after separation of solids, the ammoniated solution is re-introduced to the absorption arrangement. The ammoniated solution that re-enters the absorption arrangement may have an R value similar to the R value of the ammoniated solution that exits the absorption arrangement, since both ammonium and captured carbon dioxide have been removed from the ammoniated solution due to precipitation and separation. Thus, the ammoniated solution that re-enters the absorption arrangement may have an R of at least 1.8, conveniently at least 1.9, such as at least 1.95. In analogy, the ammoniated solution re-entering the absorption arrangement may have an R of less than 4.0, conveniently less than 2.5, more preferably less than 2.0, such as 1.95. However, if mainly ammonium bicarbonate is precipitated, the R value of the re-entering ammoniated solution may be higher than the R value of the exiting solution, such as an R value of at least 2.0, conveniently at least 2.2 such as at least 2.5.

The temperature to which the ammoniated solution which has exited the absorption arrangement is cooled may conveniently be between 0° C. and 7° C., such as between 2° C. and 5° C.

The capturing of carbon dioxide by the ammoniated solution may be exothermic, why the solution may be heated during its capturing of carbon dioxide. It may thus be convenient for the ammoniated solution that re-enters the absorption arrangement to have a lower temperature than the ammoniated solution that exits the absorption arrangement. It may also be convenient to keep down the temperature of the ammoniated solution to avoid evaporation of the ammonia into gaseous phase. As carbon dioxide is captured, the temperature of the solution is increased whereby the capacity of the solution to capture carbon dioxide without precipitation is also increased. It may thus be convenient to control the temperature of the ammoniated solution re-entering the absorption arrangement such that all of it, or at least a part or fraction of it, has a temperature of between 0° C. and 10° C., such as of between 3° C. and 7° C.

The R of the ammoniated solution in the absorption arrangement may at least partly be controlled by introducing a controlled amount of ammoniated solution having an R which is higher than the R of the ammoniated solution that exits the absorption arrangement, such as between 2.2 and 5.0, apart from the ammoniated solution that re-enters the absorption arrangement. This ammoniated solution may e.g. be carbon dioxide lean ammoniated solution from a regenerator or be fresh ammoniated solution that has not been recycled.

According to another aspect of the present disclosures, there is provided a system for removal of carbon dioxide from a process gas, the system comprising: an absorption arrangement arranged to allow contact between the process gas and an ammoniated solution within the absorption arrangement such that at least a part of the carbon dioxide of the process gas is captured by the ammoniated solution, and the absorption arrangement being arranged to, with regard to the ammoniated solution, only accommodate ammoniated solution without solids; a first heat exchanger arranged to cool the ammoniated solution including captured carbon dioxide after it has exited the absorption arrangement; a separator arranged to remove at least a part of any solids in the cooled ammoniated solution; a second heat exchanger arranged to heat the ammoniated solution after it has exited the separator; and piping and/or conduits connecting, and arranged to allow a flow of the ammoniated solution between, the absorption arrangement and the first heat exchanger, the first heat exchanger and the separator, the separator and the second heat exchanger, as well as the second heat exchanger and the absorption arrangement.

It may be convenient to use the system for removal of carbon dioxide in performing the method discussed above.

It may be convenient to arrange the first and second heat exchangers to cooperate with each other such that the ammoniated solution being cooled in the first heat exchanger is at least partly cooled by the ammoniated solution being heated in the second heat exchanger as cooling medium, and the ammoniated solution being heated in the second heat exchanger is at least partly heated by the ammoniated solution being cooled in the first heat exchanger as heating medium. This may lead to a reduction of the energy needed to run the system.

The system for removal of carbon dioxide from a process gas may further comprise a control system configured to control the $NH_3$-to-$CO_2$ mole ratio (R) of the ammoniated solution such that substantially no precipitation of solids occurs within the absorption arrangement when the absorption arrangement is in use.

The discussion above relating to the method is in applicable parts also relevant to the system. Reference is made to that discussion.

The absorption arrangement of the system may in one embodiment comprise: a first absorption stage arranged to receive the process gas and contact it with a first part of the ammoniated solution; a second absorption stage arranged to receive process gas which has passed the first absorption stage and contact it with a second part of the ammoniated solution; a first sump vessel; and a second sump vessel; wherein said first absorption stage comprises a liquid collection receptacle arranged to collect ammoniated solution from the first absorption stage and deliver it to the first sump vessel, and said second absorption stage comprises a liquid collection receptacle arranged to collect ammoniated solution from the second absorption stage and deliver it to the second sump vessel.

A multi-stage absorption arrangement, in which a number of different absorption stages, i.e. absorbers, operate under different conditions but arranged in the same frame or casing, may often constitute a superior alternative to multiple single-stage absorbers arranged in series. Advantages of the multi-stage absorption arrangement include, e.g., lower capital costs for vessels, packing and foundations.

This embodiment is based on the insight that the efficiency and versatility of a multi-stage absorption arrangements may be significantly improved by division of the sump of the absorption arrangement into two or more separate sections, referred to herein as sump vessels. Each of the sump vessels is arranged to receive used ammoniated solution from one or more predetermined absorption stages. The use of multiple sump vessels facilitates recycling of used ammoniated solution within the absorption arrangement since ammoniated solution from one or more absorption stages having similar composition and properties may be collected in a first sump vessel, while ammoniated solution from one or more other absorption stages having similar composition and properties, different to the composition and properties of the ammoniated solution collected in the first sump vessel, may be collected in a second sump vessel. The ammoniated solution collected in the first and second sump vessels may be recycled, possibly after adjustment of the composition and properties of the respective solution to a desired absorption stage. Thus, the use of multiple sump vessels allows the operating conditions, such as for example temperature, ammoniated solution composition and flow rate, of each absorption stage to be varied within a wide range.

The system may further comprise a control system configured to maintain the mole ratio R of the ammoniated solution in the first sump vessel within a range of 1.8 to 2.5.

The system may further comprise a control system configured to maintain the mole ratio R of the ammoniated solution in the second sump vessel within a range of 2.0 to 4.5.

The system may further comprise a control system configured to maintain the temperature of the first sump vessel within a range of 10 to 25° C., conveniently within a range of 15-20° C.

The system may further comprise a control system configured to maintain the temperature of the second sump vessel within a range of 10 to 25° C., conveniently within a range of 15-20° C.

The system may comprise a single control system configured to maintain the temperature and/or R value of the first and/or the second sump vessels, or the system may comprise separate control systems for maintaining temperatures and R values, or for maintaining the first and the second sump vessels.

In an embodiment, the control system comprises a device configured to introduce $NH_3$ or a medium having an R higher than the R of the ammoniated solution in at least one of the sump vessels into the ammoniated solution of that sump vessel.

The above described and other features are exemplified by the following figures and detailed description.

BRIEF DESCRIPTION OF THE DRAWING

Referring now to the FIGURE, which is an exemplary embodiment.

DETAILED DESCRIPTION

The process gas may be any type of process gas containing carbon dioxide, such as process gas from any combustion device such as furnaces, process heaters, incinerators, package boilers, and power plant boilers.

The ammoniated solution may be any type of solution containing ammonia, such as a liquid solution, especially an aqueous solution. The ammonia in the ammoniated solution may be in the form of ammonium ions and/or dissolved molecular ammonia.

The capturing of $CO_2$ from the process gas by the ammoniated solution may be achieved by the ammoniated solution absorbing or dissolving the $CO_2$ in any form, such as in the form of dissolved molecular $CO_2$, carbonate or bicarbonate.

The solids formed in the ammoniated solution may mainly be ammonium carbonate and ammonium bicarbonate, especially ammonium bicarbonate.

The carbon dioxide removal system comprises piping and/or other conduits that connects the different parts of the system and is arranged to allow ammoniated solution and process gas, respectively, to flow through the system as needed. The piping may comprise valves, pumps, nozzles etc. as appropriate to control the flow of ammoniated solution and process gas, respectively.

The one or several absorbers of the absorbing arrangement may have any design that allows the ammoniated solution to contact the process gas. It may be convenient with an absorber design in the form of a column, where the ammoniated solution flows from the top of the column to the bottom of the column and the process gas flows from the bottom of the column to the top of the column, thus the solution and the gas may meet and mix with each other in the column, creating an interface between the solution and the gas across which interface carbon dioxide may travel from the gas to the solution. The gas/solution contact may be increased, i.e. the interface area may be increased, by using a packing in the column, thereby improving the carbon dioxide capturing. The respective flows of the process gas and the ammoniated solution within, as well as to and from, the absorption arrangement may be controlled by at least one pumping system and/or by act of gravity.

If an absorber in the form of a column is used, the process gas may enter the column via a pipe connected to the lower part of the column, travel upwards through the column and exit the column via a pipe connected to the upper part of the column, and the ammoniated solution may enter via a pipe connected to the upper part of the column, travel downwards through the column by action of gravity and exit the column via a pipe connected to the lower part of the column. The ammoniated solution and/or the process gas may additionally be recirculated in the column. If the ammoniated solution is recirculated, the ammoniated solution may alternatively be entered into the column at the lower part of the column instead of at the upper part of the column, allowing a recirculation loop to transport the solution to the upper part of the column. The column may be associated with a pumping system to effect the recirculation.

In order to control the temperature of the column, at least one heat exchanger may be associated with the column. The heat exchanger may e.g. form part of a recirculation loop for the ammoniated solution. Since the capturing of carbon dioxide by the ammoniated solution is an exothermic reaction, the heat exchanger may be used to cool down the ammoniated solution to keep the interior of the absorber at a desired and substantially constant temperature.

Depending of the design of and the demands put on the absorption arrangement, it may be convenient to use a plurality of absorbers in order to remove a desired amount of the carbon dioxide from the process gas.

If a plurality of absorbers are used, they may have the same or different designs. The absorbers may be serially connected to each other to allow process gas and/or ammoniated solution to serially flow from one absorber to another absorber. However, it should be noted that the gas and the solution may flow in different directions between the serially connected absorbers. If e.g. an absorption arrangement comprises three serially connected absorbers, denoted x, y and z, the gas flow may be from absorber x to absorber y to absorber z, whereas the flow of the ammoniated solution may e.g. be from absorber y to absorber x to absorber z or in any other order.

The cooling and/or the heating, respectively, of the ammoniated solution may e.g. be done with heat exchangers, but any other means of heating and/or cooling a liquid flow may alternatively or additionally be used. It has been realized that it might be advantageous to at least partly perform the cooling and the heating by means of the same heat exchanger(s), in which heat exchanger the ammoniated solution exiting the absorption arrangement is the heating medium and the ammoniated solution from which precipitated salt has been separated is the cooling medium. Thus, energy may be conserved. Using the cooled and separated ammoniated solution as a cooling medium for cooling the ammoniated solution which has exited the absorption arrangement might not be sufficient for cooling the ammoniated solution which has exited the absorption arrangement, why it might be convenient to additionally use a regular cooling medium, such as cold water. The regular cooling medium may be connected to the same heat exchanger as the separated ammonium solution, or to a separate heat exchanger. Thus, the ammoniated solution exiting the absorption arrangement may be first cooled by the ammonium solution from the separator and then be additionally cooled by means of the regular cooling medium, or vice versa. Alternatively, the ammoniated solution is not used as a cooling or heating medium, but regular cooling and heating mediums are used instead.

The separation may be achieved by any means for separating particulate solids from a liquid, but it may be convenient to use a separator. Such a separator may be any type of separator able to separate, and thus remove, solid particles or material from the ammoniated solution. Depending on the requirements put on the separator, it might be convenient to use a separator in the form of a hydrocyclone. A hydrocyclone may be an efficient way of removing solids from the ammoniated solution. The suspension or slurry of the ammoniated solution comprising solids enters the hydrocyclone where the suspension or slurry is separated into an overhead solution reduced in, or free from, solids and an underflow rich in solids. It has been found that it may be convenient with a solids content of the ammoniated solution comprising solids entering the hydrocyclone of between 5% and 10% by weight of the ammoniated solution comprising solids entering the hydrocyclone. Ideally, substantially all the solids are removed from the ammoniated solution, giving an overhead solution substantially free from solids. It has been found that it may be convenient with a solids content of the overhead solution of between 0% and 1% by weight of the overhead solution. The underflow may be allowed to also contain some liquid solution in order to facilitate transporting the solids in a liquid stream, thus some of the ammoniated solution may also be separated to the underflow. The amount of liquid in the underflow may be enough to transport the solids in a liquid stream but without reducing the carbon dioxide concentration more than necessary to allow this transportation. The underflow may be a leaving suspension or slurry, leaving the ammoniated solution.

Regardless of the type of separator used, it may be convenient that most or substantially all of the solids are removed from the ammoniated solution to a leaving suspension or slurry, in which suspension or slurry the amount of liquid has been balanced to allow transportation of the solids in a liquid stream but without reducing the carbon dioxide concentration more than necessary to allow this transportation. It may be convenient to have a solids content of at least 10% by weight of the leaving suspension or slurry, such as between 10% and 20% by weight of the leaving suspension or slurry.

Figure 1:
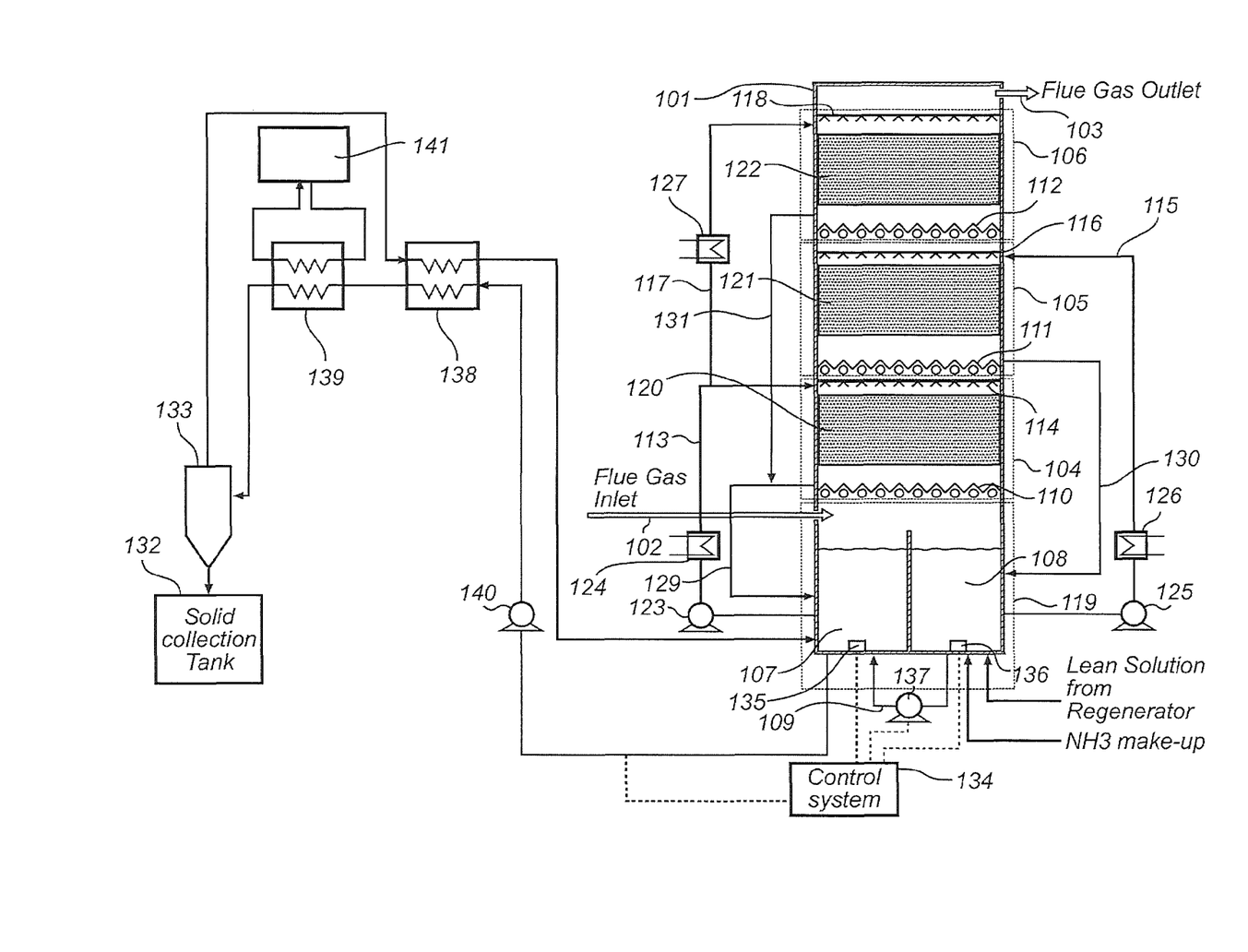
FIG. 1 is a diagram generally depicting an embodiment of a $CO_2$ capture system that includes a multi-stage absorbing arrangement with two sump vessels.

With reference to FIG. 1, an embodiment in accordance with the present disclosure will now be described.

In this embodiment, a $CO_2$ capture system is provided that includes three (3) absorption stages, i.e. three absorbers. It is, however, possible to include more or fewer absorption stages in the capture system or to arrange them differently in relation to each other.

Referring to FIG. 1 an absorption arrangement 101 in the form of a single absorption vessel is provided. The absorption arrangement 101 is configured to receive a process gas stream via an inlet 102 located near the bottom of the vessel 101 and to allow the process gas stream to pass upward and through the absorption arrangement 101 to exit via an outlet 103 located near the top of the vessel 101.

The process gas stream entering the absorption arrangement 101 will typically contain less than one percent moisture and low concentrations of $SO_2$, $SO_3$, HCl, and particulate matter which will typically be removed via air pollution control systems (not shown) upstream from the $CO_2$ capture system.

The absorption arrangement 101 is configured to absorb $CO_2$ that may be contained in a process gas stream, using an ammoniated solution. In an embodiment, the ammoniated solution may be composed of, for example, water and ammonium ions, bicarbonate ions, carbonate ions, and/or carbamate ions.

The $CO_2$ capture system comprises three absorption stages 104, 105 and 106, the first and third absorption stages 104 and 106 being connected to a first sump vessel 107, and the second absorption stage 105 being connected to a second sump vessel 108 in a manner described in detail herein below.

The $CO_2$ capture system comprises two separate ammoniated solution sump vessels 107 and 108, referred to herein as the first (107) and second (108) sump vessel. The term "separate" generally means that the ammoniated solution in the first sump vessel 107 is not in continuous liquid contact with the ammoniated solution in the second sump vessel 108. Although the first and second sump vessels are not in continuous liquid contact, the system may further comprise a conduit 109 for transferring ammoniated solution from the second sump vessel 108 to the first sump vessel 107.

The first sump vessel 107 is arranged to receive used ammoniated solution from the first absorption stage 104 via liquid collection receptacle 110, and from the third absorption stage 106 via liquid collection receptacle 112. The second sump vessel 108 is arranged to receive used ammoniated solution from the second absorption stage 105 via liquid collection receptacle 111. The first sump vessel is arranged to supply ammoniated solution to the first absorption stage via a solution delivery path 113 and a liquid distribution device 114 and to the third absorption stage via a solution delivery path 117 and a liquid distribution device 118. The second sump vessel is arranged to supply ammoniated solution to the second absorption stage via a solution delivery path 115 and a liquid distribution device 116. The first and/or second sump vessels 107 and 108 are further configured for receiving $CO_2$ lean ammoniated solution from a regenerator (not shown) and/or make-up $NH_3$.

In the embodiment shown in FIG. 1, the first and second sump vessels 107 and 108 are formed by two sub-sections of the bottom portion 119 of the absorption arrangement, below the first absorption stage 104.

The $CO_2$ capture system may further comprise a control system for controlling the $NH_3$-to-$CO_2$ mole ratio (R) in the first and second sump vessel to be within a desired range. The control system may comprise sensors for automated or manual measurement of relevant parameters, such as e.g. pH value, ammonia concentration and/or $CO_2$ concentration, and devices, such as liquid connections, valves and pumps, configured for adjustment of such parameters, e.g. by addition of make-up $NH_3$ and/or removal of $CO_2$. The system may comprise an automatic controller 134, by which the $NH_3$-to-$CO_2$ mole ratio is maintained at desired values in the first and second sump vessels 107 and 108. For example, the automatic controller 134 may be a general-purpose computer, application specific computing device or other programmable controller that receives input signals indicative of the R value from sensors 135 and 136 in the first and second sump vessels 107 and 108. The automatic controller 134 may provide control signals to a pump 137, control valve, or other fluid flow adjusting device, to maintain R within the first sump vessel 107 to within the desired range, and may provide control signals to the $NH_3$ make-up supply and/or the lean solution supply from the regenerator to maintain R within the desired range in the second sump vessel 108. In an embodiment, the R value in the first sump vessel is maintained in a range of 1.8 to 2.5, such as about 2.0, by replacing a portion of the ammoniated solution in the first sump vessel 107 with higher R ammoniated solution from the second sump vessel 108 via conduit 109, and the R value in the second sump vessel may be maintained in a range of 2.0 to 4.0, such as about 2.5, by replacing the portion of ammoniated solution sent to the first sump vessel with $CO_2$ lean ammoniated solution from the regenerator and/or make-up $NH_3$.

Each absorption stage 104, 105 and 106 is configured to include one or more suitable gas-liquid mass transfer devices (MTD) 120, 121 and 122, respectively, a liquid distribution device 114, 116 and 118, respectively, and a solution delivery path (SDP) 113, 115 and 117, respectively.

Each mass transfer device 120, 121 and 122 is configured to contact ammoniated solution with the process gas stream as the process gas flows upwards through the absorption arrangement 101, counter current to the ammoniated solution containing, for example, a dissolved mix of ammonium ions, carbonate ions, ammonium bicarbonate and/or carbamate ions. Mass transfer devices (MTD) 120, 121 and 122 may be, for example, structured or random packing materials.

Liquid distribution device(s) 114, 116 and 118 are configured to introduce ammoniated solution into the absorption arrangement 101. Each liquid distribution device may be configured as, for example, one or more spray head nozzles and/or conduit with perforations, holes and/or slots or a combination thereof.

Each SDP 113, 115 and 117 is configured to deliver a flow of ammoniated solution to the respective absorption stage via a liquid distribution device 114, 116 and 118, respectively. Each SDP will preferably include one or more cooling systems, such as, for example, a heat exchange device 124, 126 and 127, for cooling ammoniated solution pumped through the SDP. A control system may also be provided for controlling the flow of the ammoniated solution and maintaining ammoniated solution temperature at a predetermined level or within a predetermined temperature range. The control system may include a controller, for example a general purpose computer, an application specific computing device or other programmable controller, that receives input signals from one or more temperature sensor and provides control signals to a heat exchange device to effect cooling or heating of the ammoniated solution. The control system may be integrated with the control system described above for controlling the R-value of the ammoniated solution, and the controller, e.g. computing device, may be the same. With reference to FIG. 1, the first absorption stage 104 includes an SDP 113 that is composed of conduit/pipe that connects the first sump vessel 107 with liquid distribution device 114 via pump 123 and heat exchanger 124. The second absorption stage 105 includes an SDP 115 that is composed of conduit/pipe that connects a second sump vessel 108 to the liquid distribution device 116 via pump 125 and heat exchanger 126. The third absorption stage 106 includes an SDP 117 that is composed of conduit/pipe that connects the first sump vessel 107, with liquid distribution device 118 via pump 123, heat exchanger 124 and heat exchanger 127.

Each absorption stage 104, 105 and 106 may comprise a device for collecting ammoniated solution which has passed through the respective MTD 120, 121 and 122. Each such liquid collection receptacle 110, 111 and 112 may be configured to collect all or a portion of the liquid which passes through respective MTD. Each liquid collection receptacle may for example be configured to collect substantially all, i.e.

about 95% or more, such as 98% or more of the ammoniated solution which passes through respective MTD. Alternatively, a major portion of the ammoniated solution which passes through respective MTD may be collected, for example more than 50%, such as more than 70% or more than 90% of the ammoniated solution. The liquid collection receptacles may be arranged or configured such that process gas rising up through the absorption arrangement 101 may pass through or alongside the liquid collection receptacles. The liquid collection receptacles may for example comprise a sloped collection tray or bubble cap tray. The liquid collection receptacles may further comprise one or more liquid outlets configured for removal of liquid collected by the liquid collection receptacles. The liquid collection receptacle 110 of the first absorption stage is connected to the first sump vessel 107 via conduit 129 which allows used ammoniated solution collected by the liquid collection receptacle 110 to be directed to the first sump vessel 107 for recycling. The liquid collection receptacle 111 of the second absorption stage is connected to the second sump vessel 108 via conduit 130 which allows used ammoniated solution collected by the liquid collection receptacle 111 to be directed to the second sump vessel 108 for recycling. The liquid collection receptacle 112 of the third absorption stage is connected to the first sump vessel 107 via conduit 131 which allows used ammoniated solution collected by the liquid collection receptacle 112 to be directed to the first sump vessel 107 for recycling.

The liquid collection receptacles may further comprise a respective flush system (not shown) for cleaning. In some embodiments, liquid which has passed through the MTD of the first absorption stage 104 may be collected directly in a bottom portion of the absorption arrangement. In such embodiments, no further liquid collection receptacle may be required for the first absorption stage 104.

The first absorption stage 104 is configured to contact a relatively low R ammoniated solution received from the first sump vessel 107 via SDP 113 with the process gas stream. This ammoniated solution is pumped from the first sump vessel 107 via pump 123 to the liquid distribution device 114, which sprays the ammoniated solution downward and onto the mass transfer device 120. In this way the process gas stream comes into contact with the ammoniated solution sprayed from liquid distribution device 114. The temperature of the ammoniated solution at absorption stage 104 may be controlled to be in a range from 5° C. to 20° C. or higher. After the ammoniated solution has been contacted with the process gas stream it is more rich in $CO_2$ (rich solution). This rich in $CO_2$ solution is discharged from absorption stage 104 to the first sump vessel 107 via conduit 129. A portion of the ammoniated solution in the first sump vessel 107 may be pumped to a regenerator system (not shown) to increase the ammonia-to-$CO_2$ mole ratio (R) of the liquid.

Te first absorption stage 104 may be configured to capture 50-80% of the carbon dioxide contained in the process gas entering the absorption arrangement 101, conveniently 60-70%.

The second absorption stage 105 may be configured to capture 10-40% of the carbon dioxide contained in the process gas entering the absorption arrangement 101, conveniently 20-30%. Here, relatively high R ammoniated solution from the second sump vessel 108 is sprayed via liquid distribution device 116 onto the MTD 121. The high R solution sprayed via the spray system 116 is contacted with the process gas stream as it flows from the first absorption stage 104 upward through the MTD 121 of the second absorption stage.

The absorption arrangement 101 may optionally further comprise a third absorption stage 106 for further removal of $CO_2$ from the process gas and for reduction of ammonia slip, i.e. evaporation of ammonia, from the previous absorption stages.

The process gas rising upward in the absorption vessel 101 from the second absorption stage 105 contains a low concentration of $CO_2$ (for example 20% or less, or 10% or less, of the $CO_2$ in the process gas entering the absorption arrangement 101) and a relatively high concentration of $NH_3$ (for example from 5000 ppm up to 30000 ppm). The high concentration of ammonia in the process gas (ammonia slip) from the second absorption stage 105 is a result of the high R of the ammoniated solution in the second absorption stage 105. A large portion of the ammonia that has evaporated in the second absorption stage 105 may be re-captured back into the ammoniated solution via a third absorption stage 106, which may operate at a lower temperature.

In the third absorption stage 106, a relatively small flow of ammoniated solution having a low temperature (for example less than 10° C. and conveniently about 5° C.) is sprayed via liquid distribution device 118 onto the MTD 122 wherein it is contacted with the process gas stream as it flows upward through the MTD 122. The ammoniated solution discharged from the third absorption stage 106 may be collected in the first sump vessel 107 via conduit 131.

The absorption arrangement 101 is configured to provide for circulation, by means of a pump 140, of ammoniated solution collected at the bottom of the first sump vessel 107 to a combined cooling/heating heat exchanger 138 arranged to cool the ammoniated solution using the separated ammoniated solution as a cooling medium. The combined heat exchanger 138 is connected to a cooling heat exchanger 139 to allow ammoniated solution to flow from the combined heat exchanger 138 to the cooling heat exchanger 139. The cooling heat exchanger 139 is arranged to further cool the ammoniated solution using cold water from the cold water source 141 as a cooling medium. The cooling heat exchanger 139 is connected to a separator in the form of a hydrocyclone 133 arranged to separate solid material such as precipitated salt from the cooled ammoniated solution flowing from the cooling heat exchanger 139 to the hydrocyclone 133. The hydrocyclone 133 is connected to a solid collection tank 132 arranged to receive the solids rich underflow from the hydrocyclone 133. The hydrocyclone 133 is also connected to the combined heat exchanger 138 which is arranged to heat the overflow low on solids from the hydrocyclone 133 using the ammoniated solution from the first sump vessel 107 as a heating medium. The combined heat exchanger is connected to the first sump vessel 107 of the absorption arrangement 101 to allow re-entry of the heated ammoniated solution.

An example of a method for removal of carbon dioxide from a process gas by means of the system of FIG. 1 may be summarised in the following steps:

In step 1, the ammoniated solution in the form of an aqueous solution, as well as the process gas, enters the absorption arrangement via pipes. The absorption arrangement may comprise one or a plurality of absorbers or absorption stages, conveniently in the form of packed columns or beds.

In step 2, the ammoniated solution, as well as the process gas, enters the first absorption stage. The ammoniated solution enters the first absorption stage at the top of the bed, after which the ammoniated solution flows downward though the MTD of the first absorption stage. Simultaneously, the process gas enters the first absorption stage at the bottom of the bed, after which the process gas flows upward though the MTD of the first absorption stage. The ammoniated solution and the process gas thus meet and are contacted with each other as they flow counter currently in the first absorption stage. The packing of the bed of the MTD acts to increase the mixing and the contact area, interface, between the liquid phase and the gas phase in the bed. Carbon dioxide of the process gas travels from the gas phase into the liquid phase and is thus captured by the ammoniated solution. The ammoniated solution and/or the process gas may be recirculated in the absorption arrangement. During this re-circulation, possibly outside of the absorption arrangement, the temperature of the ammoniated solution may also be adjusted by means of a heat exchanger.

It should be noted that the ammoniated solution and/or the process gas may have already passed though one or several absorbers or absorption stages after entering the absorption arrangement prior to entering said first absorption stage, depending on the design of the system.

In step 3, the ammoniated solution is contacted with the process gas in the second absorption stage. The discussion above relating to the first absorption stage in step 2 is also relevant to the second absorption stage in step 3.

In step 4, the ammoniated solution is contacted with the process gas in the third absorption stage. The discussion above relating to the first absorption stage in step 2 is also relevant to the third absorption stage in step 4.

In step 5, the ammoniated solution leaves the absorption arrangement via a pipe or other conduit. The ammoniated solution leaving the absorption arrangement may be taken from any part of the absorption arrangement, such as from the first or second sump vessels or from any one of the absorption stages, e.g. from any one of the liquid collection receptacles of the absorption stages, or from several of these parts.

In step 6, the ammoniated solution enters at least one heat exchanger and is cooled down. As a result of the cooling, a part of the captured carbon dioxide is precipitated as salt. It may be preferred to use two separate heat exchangers, the first using cooled ammoniated solution as cooling medium and the second using cold water as cooling medium.

In step 7, the cooled ammoniated solution including salt solids enters a hydrocyclone, or other separating means. In the hydrocyclone, the ammoniated solution is separated into a solid rich underflow and an overhead solution with less than 1 wt % solids. Thus, most of the solids have been removed from the ammoniated solution by the hydrocyclone. The solid rich underflow may be transferred to a solid collection tank or directly to a regenerator where it is subjected to increased temperature and increased pressure in order to remove the captured carbon dioxide in the form of a leaving carbon dioxide gas stream of high purity. The thus regenerated ammoniated solution from the underflow may then be allowed to re-enter the absorption arrangement to capture more carbon dioxide.

In step 8, the ammoniated solution, i.e. the overhead solution from the hydrocyclone, is reheated. In order to save energy, the reheating may conveniently by made by means of the same first heat exchanger as discussed under step 6, with the ammoniated solution cooled in step 6 as heating medium. If needed, an additional heat exchanger with a traditional heating medium, such as warm water, may also be employed. In heating the ammoniated solution, the solution is rendered unsaturated with respect to carbon dioxide, allowing it to capture more carbon dioxide without inducing any precipitation.

In step 9, the reheated ammonium solution re-enters the absorption arrangement to capture more carbon dioxide from the process gas. The ammoniated solution may re-enter the absorption arrangement at the top of any one or several of the absorption stages, or in any one or both of the sump vessels, or anywhere else in the absorption arrangement.

It should be noted that the method may be continuous. Thus all the steps above may occur concurrently involving different parts of the ammoniated solution.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance or chronology, but rather the terms first, second, etc. are used to distinguish one element from another.

The invention claimed is:

1. A system for removal of carbon dioxide from a process gas, the system comprising:
an absorption vessel that receives a process gas and an ammoniated solution for contacting the process gas and the ammoniated solution in the absorption vessel such that at least a part of the $CO_2$ of the process gas is captured by the ammoniated solution to provide a $CO_2$ lean process gas and an ammoniated solution rich in $CO_2$ without precipitation;
a first heat exchanger to cool the ammoniated solution rich in $CO_2$ including captured carbon dioxide after it has exited the absorption vessel to precipitate solids from the ammoniated solution rich in $CO_2$:
a separator to remove at least a part of any solids in the cooled ammoniated solution; and
a second heat exchanger to heat the ammoniated solution after it has exited the separator, wherein the heated ammoniated solution is returned to the lower portion of the absorption vessel.

2. The system according to claim 1, further comprising:
a pump for providing ammoniated solution to an upper portion of the absorption vessel; and
a third heat exchanger for cooling ammoniated solution pumped to the upper portion of the absorption vessel to a temperature between about 10° C. and 20° C.

3. The system according to claim 1, wherein the first heat exchanger cools the ammoniated solution to a temperature between about 0° C. and 10° C.

4. The system according to claim 1, wherein the first heat exchanger cools the ammoniated solution to a temperature between about 7° C. and 15° C.

5. The system according to claim 1, wherein the separator is a hydrocyclone.

6. The system according to claim 1, wherein the first and second heat exchangers are arranged to cooperate with each other such that the ammoniated solution being cooled in the first heat exchanger is at least partly cooled by the ammoniated solution being heated in the second heat exchanger as cooling medium, and the ammoniated solution being heated in the second heat exchanger is at least partly heated by the ammoniated solution being cooled in the first heat exchanger as heating medium.

7. The system of claim 1, further comprising a control system configured to control the $NH_3$-to-$CO_2$ mole ratio (R) of the ammoniated solution such that substantially no precipitation of solids occurs within the absorption vessel when the absorption vessel is in use.

8. The system according to claim 7, wherein the control system automatically controls the molar ratio (R).

9. The system according to claim 7, wherein the control system the molar ratio (R) in the absorption arrangement within a desired range.

10. The system according to claim 9, further comprising a sensor providing a signal indicative of the molar ratio within the absorption vessel, wherein the control system adjusts the molar ratio in response to the signal.

11. The system according to claim 10, further comprising actuating a fluid flow device that adjusts the flow of the ammoniated solution in response to the signal received from the sensor.

12. A system for removal of carbon dioxide from a process gas, the system comprising:
- an absorption vessel that receives a process gas and an ammoniated solution for contacting the process gas and the ammoniated solution in the absorption vessel such that at least a part of the $CO_2$ of the process gas is captured by the ammoniated solution to provide a $CO_2$ lean process gas and an ammoniated solution rich in $CO_2$ without precipitation; the absorption vessel includes:
    - a first absorption stage arranged to receive the process gas and contact it with a first part of the ammoniated solution;
    - a second absorption stage arranged to receive process gas which has passed the first absorption stage and contact it with a second part of the ammoniated solution;
    - a first sump vessel; and
    - a second sump vessel;
    wherein said first absorption stage comprises a liquid collection receptacle arranged to collect ammoniated solution from the first absorption stage and deliver it to the first sump vessel, and said second absorption stage comprises a liquid collection receptacle arranged to collect ammoniated solution from the second absorption stage and deliver it to the second sump vessel;
- a first heat exchanger to cool the ammoniated solution rich in $CO_2$ including captured carbon dioxide after it has exited the absorption vessel to precipitate solids from the ammoniated solution rich in $CO_2$;
- a separator to remove at least a part of any solids in the cooled ammoniated solution; and
- a second heat exchanger to heat the ammoniated solution after it has exited the separator, wherein the heated ammoniated solution is returned to the absorption vessel.

13. The system of claim 12, further comprising a control system configured to maintain the $NH_3$-to-$CO_2$ mole ratio (R) of the ammoniated solution in the first sump vessel within a range of 1.8 to 2.5, and to maintain the temperature of the first sump vessel within a range of 10 to 25° C.

14. The system of claim 12, further comprising a control system configured to maintain the $NH_3$-to-$CO_2$ mole ratio (R) of the ammoniated solution in the second sump vessel within a range of 2.0 to 4.5, and to maintain the temperature of the second sump vessel within a range of 10 to 25° C.

15. The system according to claim 13, wherein said control system comprises a device configured to introduce $NH_3$ or a medium having an $NH_3$-to-$CO_2$ mole ratio (R) higher than the R of the ammoniated solution in one of the sump vessels into said sump vessel.

* * * * *